United States Patent
Bauer et al.

(10) Patent No.: US 7,905,214 B2
(45) Date of Patent: Mar. 15, 2011

(54) METHOD FOR ASCERTAINING THE GAS WORK PERFORMED BY THE CYLINDER PRESSURE ON THE PISTON OF A CYLINDER AND THE INTERNAL MEAN PRESSURE

(75) Inventors: Erwin Bauer, Lappersdorf (DE); Dietmar Ellmer, Regensburg (DE)

(73) Assignee: Continental Automotive GmbH, Hannover (DE)

(*) Notice: Subject to any disclaimer, the term of this patent is extended or adjusted under 35 U.S.C. 154(b) by 220 days.

(21) Appl. No.: 12/329,562

(22) Filed: Dec. 6, 2008

(65) Prior Publication Data

US 2009/0150053 A1 Jun. 11, 2009

(30) Foreign Application Priority Data

Dec. 10, 2007 (DE) .......................... 10 2007 059 354

(51) Int. Cl.
*F02M 7/00* (2006.01)

(52) U.S. Cl. ........ 123/435; 123/673; 701/114; 73/114.13

(58) Field of Classification Search .................. 701/101, 701/114, 115; 123/434, 435, 673, 674; 73/114.13, 73/114.16
See application file for complete search history.

(56) References Cited

U.S. PATENT DOCUMENTS

| | | | | |
|---|---|---|---|---|
| 4,131,097 | A * | 12/1978 | Sawada et al. | 123/406.42 |
| 5,127,262 | A | 7/1992 | Demizu et al. | 73/117.3 |
| 5,642,713 | A * | 7/1997 | Schmitz et al. | 123/435 |
| 6,388,444 | B1 * | 5/2002 | Hahn et al. | 324/378 |
| 7,489,998 | B2 * | 2/2009 | Bauer et al. | 701/103 |
| 2008/0196488 | A1 * | 8/2008 | Bauer et al. | 73/114.53 |

FOREIGN PATENT DOCUMENTS

| | | |
|---|---|---|
| DE | 4116518 | 5/1991 |
| DE | 10127913 | 6/2001 |
| DE | 102006030842 | 7/2006 |

* cited by examiner

*Primary Examiner* — John T Kwon
(74) *Attorney, Agent, or Firm* — King & Spalding L.L.P.

(57) ABSTRACT

To determine the gas work $W_K$ from the areas formed by the cylinder pressure curve over the associated stroke volume $V_\alpha$, a cylinder-pressure-proportional integrator is started integrating the signals of the cylinder pressure sensor in multiple integrator runs depending on a settable integrator capacitance. A lower and an upper threshold value are predefined, whose difference corresponds to the integrator capacitance. Upon reaching one of the threshold values, respective new integrator runs are started, at the beginning and end of which the current crankshaft angle α (is detected, respectively. For each integrator run, the associated individual work is determined depending on the product of the integrator capacitance and the particular covered stroke volume and the gas work resulting from the cylinder pressure curve is determined by summation of the individual works. The gas work may be used in particular for determining the internal mean pressure of the cylinder.

22 Claims, 2 Drawing Sheets

METHOD FOR ASCERTAINING THE GAS WORK PERFORMED BY THE CYLINDER PRESSURE ON THE PISTON OF A CYLINDER AND THE INTERNAL MEAN PRESSURE

CROSS-REFERENCE TO RELATED APPLICATIONS

This application claims priority to German Patent Application No. 10 2007 059 354.8 filed Dec. 10, 2007, the contents of which is incorporated herein by reference in its entirety.

TECHNICAL FIELD

The present invention relates to a method for ascertaining the gas work performed by the cylinder pressure of a cylinder of an internal combustion engine on the piston of this cylinder, in which the cylinder pressure is detected by a cylinder pressure sensor assigned to the cylinder and the associated stroke volume is derived from a crankshaft sensor assigned to a crankshaft, and in which the gas work is determined from the areas formed by the cylinder pressure curve over the stroke volume. In addition, the invention relates to a control unit (ECU) for performing a method of this type.

BACKGROUND

A method of this type is already known from DE 41 16 518 C2.

The work $W_{KA}$ of the gas force transmitted by the cylinder pressure during a work cycle to the piston is determined as the ring integral of the cylinder pressure p over the (stroke) volume change $dV_\alpha$, which is a function of the piston path (i.e., of the crankshaft angle α), compare, for example, "Handbuch Verbrennungsmotor [Handbook of Internal Combustion Engines]", by Richard van Basshuysen/Fred Schäfer, second edition, June 2002, chapter 3.6. The variable $W_{KA}$ may be determined by a simulation model or from the p-V diagram by planimetration (measuring the area content). However, the typical method also used in the patent specification according to the species comprises sampling the cylinder pressure discretely via the angle encoder (α) and calculating $W_K$ (at least in a predetermined KW range) via a numeric integration as a summation function. Calculating the angle-dependent volume change over the engine geometry, storing it in a table, and then outputting it in accordance with the current crankshaft angle and finally using it in the calculation of $W_K$ are also known for simplifying the calculation.

It is known that criteria, which are directly relevant for the regulation and control of the engine, may be derived from the cylinder pressure curve of an internal combustion engine. The internal or indexed mean pressure $p_{mi}$ is frequently selected as a significant variable for describing the gas work performed during the engine combustion. It is an equivalent to the specific work acting on the piston and is determined as the integral from the cylinder pressure curve over the stroke volume $V_h$ of a work cycle (p-V diagram). Variables such as power and torque may also be calculated therefrom.

Because no cylinder pressure sensors have been used up to this point in internal combustion engines in large-batch manufacturing, the ascertainment of engine variables of this type has been restricted to specially prepared experimental engines, which have predominantly been used for development and research purposes. However, it is to be assumed that in the course of continuously stricter exhaust regulations that cylinder pressure sensors will also be used in the future in mass-produced engines, because they deliver important information about the combustion process. They represent a valuable instrument for the process monitoring and control and thus for maintaining the applicable emission limiting values. This relates to both gasoline and also diesel engines. The gasoline-engine CAI method (controlled auto ignition), which is currently being developed for start of production, is especially noted in this context. Because of the sensitivity of this combustion method, the use of cylinder pressure sensors is indispensable therein for the combustion process control and/or regulation.

The calculation of specific engine variables such as the internal mean pressure $p_{mi}$ or the combustion focal point has typically been performed until now, as described above, using step-by-step integration at relatively high sampling rates (e.g., in 1° KW steps) and/or resolution, so that a high-performance measurement and data processing technology is required. A conventional engine control unit (ECU) will typically not suffice for this power and performance demand, however.

Moreover, a method for converting highly dynamic sensor signals for an engine controller is also known from DE 101 27 913 B4. Because systematic errors may occur in the digital sampling of the sensor signals and/or engine state variables, which are each detected at individual points in time, it is suggested that the signal of a cylinder pressure be integrated using an integrator in particular for a predefined short time span in comparison to the work cycle and the resulting integrator value be input into the engine controller, the time span being selected in such a way that the integrator value permits a conclusion about the overall signal curve of the cylinder pressure because of better digital resolution capability.

SUMMARY

According to various embodiments, an improved method of the type cited at the beginning can be provided which in particular allows the internal mean pressure to be ascertained using a mass-produced ECU in a simple way.

According to an embodiment, in a method for ascertaining the gas work $W_K$ performed by the cylinder pressure of a cylinder of an internal combustion engine on the piston of this cylinder, in which the cylinder pressure p is detected by a cylinder pressure sensor assigned to the cylinder, and the associated stroke volume $V_\alpha$ is derived from a crankshaft sensor assigned to a crankshaft, and in which the gas work $W_K$ is determined from the areas formed by the cylinder pressure curve over the stroke volume $V_\alpha$, the method may comprise the steps of: —starting a cylinder-pressure-proportional integrator, which integrates the signals of the cylinder pressure sensor in more or fewer integrator runs as a function of a settable integrator capacitance dp, the integrator capacitance dp being set by presetting a lower and upper threshold value for the integrator value,—upon reaching one of the threshold values, starting a new integrator run in each case, at the beginning and end of which the current crankshaft angle α (is detected in each case,—for each integrator run, determining the associated individual work $dW_K$ on the basis of the product of the integrator capacitance and the particular covered stroke volume $dV_\alpha$, and the gas work $W_K$ resulting from the cylinder pressure curve is determined by summation of the individual works $dW_K$.

According to a further embodiment, the integrator may run for ascertaining the gas work occur over at least one predefinable partial range of the work cycle. According to a further embodiment, the integrator capacitance dp may be set differently in at least two predefinable partial sections of a work cycle with the aid of the threshold values. According to a further embodiment, the integrator may be reset to the lower threshold value for a new integrator run upon reaching the upper threshold value. According to a further embodiment, the integrator may be impinged with an inverted signal of the cylinder pressure sensor for a new integrator run upon reaching the upper threshold value until the lower threshold value is reached, so that the integrator value runs back and forth between the two threshold values during the integrator runs. According to a further embodiment, the range of the cylinder pressure to be detected by the cylinder pressure sensor may be divided into at least two individual ranges and a complete sensor travel is assigned to each individual range, the integrator being started in each case upon reaching a measuring range limit. According to a further embodiment, the gas work $W_{KA}$ performed on the piston during a work cycle can be ascertained from the individual works $dW_K$ by summation, a high-pressure component AS and a low-pressure component LWS (charge cycle work) resulting in accordance with the areas formed in the p-V diagram and the low-pressure component LWS being taken into consideration in the summation by a negative sign. According to a further embodiment, a new integrator run can be started upon a measuring range change or a sign change and the corresponding proportional value of the integrator capacitance dp of the aborted integrator run is incorporated in the summation. According to a further embodiment, the top and bottom dead centers or other moments in time repeating in the course of the work cycle can be ascertained and incorporated in the determination of the gas work $W_{KA}$. According to a further embodiment, the top and bottom dead centers and other moments in time repeating in the course of the work cycle can be ascertained and incorporated in the determination of the gas work $W_{KA}$. According to a further embodiment, upon the ascertainment of the gas work $W_{KA}$, the low-pressure component (charge cycle work) LWS for the particular operating point can be taken from an ignition map, so that no determination of individual works $dW_K$ occurs during the exhaust and intake strokes. According to a further embodiment, upon the ascertainment of the gas work $W_{KA}$, the low-pressure component (charge cycle work) LWS can be determined under the assumption that the cylinder pressure p corresponds to the intake manifold pressure during the intake stroke and to the ambient pressure during the exhaust stroke, so that no determination of individual works $dW_K$ occurs during the exhaust and intake strokes. According to a further embodiment, the ascertainment of the gas work $W_{KA}$ performed over the entire work cycle can be used to determine the internal mean pressure $p_{mi}$ of the cylinder. According to a further embodiment, at least one of the power and the torque of the internal combustion engine can be determined with the aid of the internal mean pressure of the cylinder.

According to another embodiment, a control unit may have an integrator and at least one calculation unit, which executes steps according to at least one of the embodiments described above to ascertain the gas work $W_K$ performed by the cylinder pressure on the piston of a cylinder of an internal combustion engine.

BRIEF DESCRIPTION OF THE DRAWINGS

The preferred embodiments of the present invention are explained in greater detail with reference to the appended drawing. In the figures.

DETAILED DESCRIPTION

Figure 1:
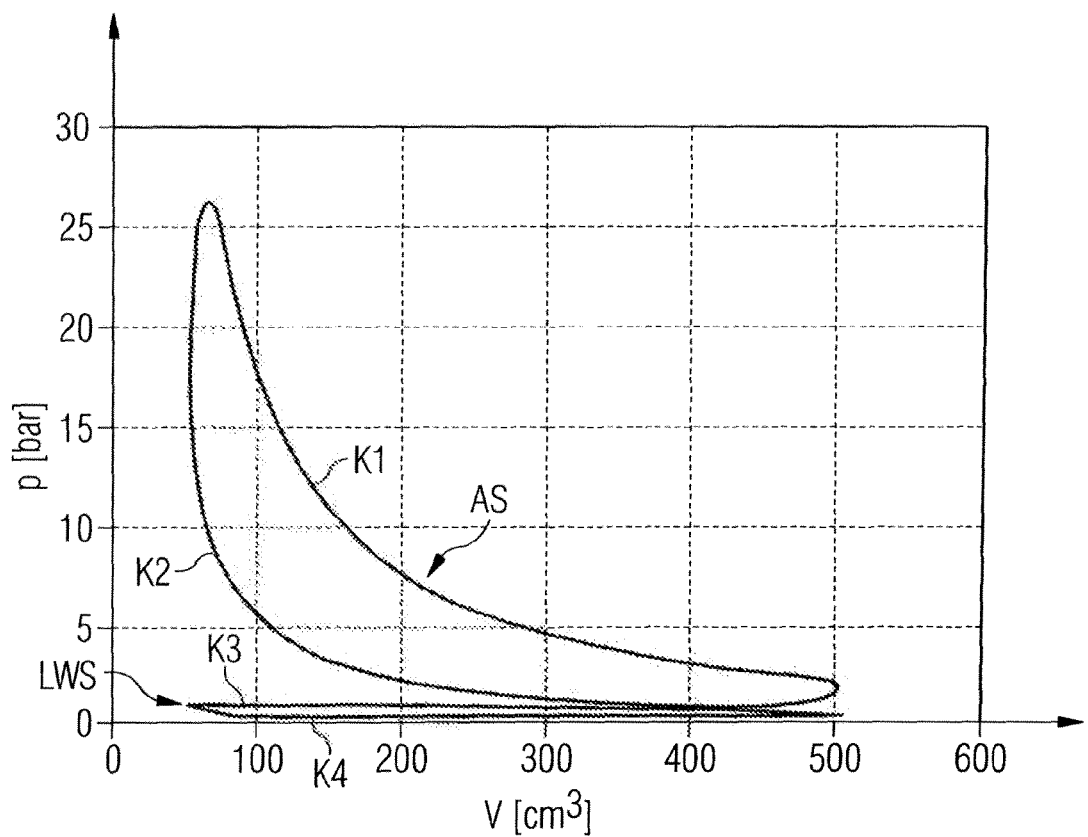
FIG. 1 shows a schematic illustration of an example of a conventional p-V diagram for the cyclic process of a four-stroke internal combustion engine.

In regard to the method for ascertaining the gas work performed by a cylinder of an internal combustion engine, according to various embodiments, the various embodiments build on the conventional methods in that they comprises the following steps: starting a cylinder-pressure-proportional integrator, which integrates the signals of the cylinder pressure sensor in more or fewer integrator runs as a function of a settable integrator capacitance dp, the integrator capacitance dp being set by presetting a lower and an upper threshold value for the integrator value, starting a new integrator run in each case upon reaching one of the threshold values, the current crankshaft angle α being detected at the beginning and end of each of the integrator runs, determining the individual work $dW_K$ for each integration cycle on the basis of the product of the integrator capacitance dp and the particular covered stroke volume $dV_\alpha$ and determining the gas work $W_K$ resulting from the cylinder pressure curve by summation of the individual works $dW_K$.

The various embodiments are accordingly based on the area $W_K$ to be ascertained being "measured" by computer with the aid of the "mass unit" dp defined by the integrator capacitance, which is selectable—in particular depending on the required position, by many individual areas $dp*dV_\alpha$. The advantage over the known discrete time sampling, in which high sampling rates are also used, which is computer-intensive, which would not be necessary at all here because of the cylinder pressure curve, is primarily that the sampling steps are not constant, but rather a function of the pressure curve. In the range of higher pressure changes and/or high pressure, the number of the integrator runs increases automatically and thus the precision of the method, while in less "interesting" ranges, fewer integrator runs occur and the computing control unit is relieved further. The gas work $W_K$ may be ascertained in regard to a complete work cycle or a part thereof.

According to an embodiment, the integrator runs for ascertaining the gas work occur over at least one predefinable partial range of the work cycle. The integrator run and/or the sequence of integrator runs may thus be started at a freely selectable point in time and/or crankshaft angle, stopped, and reset, to thus also be able to individually detect, analyze, and compare specific partial ranges of the total cycle to one another.

According to a further embodiment, which can be seen as especially advantageous, the integrator capacitance dp is set differently in at least two predefinable partial sections of a work cycle with the aid of the threshold values for the integrator value. Because the threshold values and/or the integrator capacitance dp may also be varied within one work cycle, it is possible to meet differing precision requirements in regard to individual partial sections of the work cycle.

An essential advantage of the various embodiments is that, according to a further embodiment, a simple but still precise method for ascertaining the cylinder mean pressure $p_{mi}$ may be represented with little effort. This significant and important engine variable represents the basis of a combustion process check, as the sensitive gasoline-engine CAI method requires, for example. In all embodiments, the ascertainment of the gas work performed over the entire work cycle $W_{KA}$ may be used to determine the internal mean pressure $p_{mi}$ of the cylinder. The power and/or the torque of the internal combustion engine may thus also be determined with the aid of the internal mean pressure $p_{mi}$ of the cylinder.

According to an embodiment, the integrator is reset to the lower threshold value for a new integrator run upon reaching the upper threshold value. According to a further embodiment, which is alternative thereto and can be seen as especially advantageous, the integrator is impinged with an inverted signal of the cylinder pressure sensor for a new integrator run upon reaching the upper threshold value until the lower threshold value is reached, so that the integrator value runs back and forth between the two threshold values during the integrator runs. A continuous signal curve thus results and no signal gaps arise as with the alternative reset of the signal.

According to yet a further embodiment, the method is also executable in connection with cylinder pressure measuring methods, in which the range of the cylinder pressure to be detected by the cylinder pressure sensor is divided into at least two individual ranges and the complete sensor travel is assigned to each individual range, the integrator being started in each case upon reaching a measuring range limit.

According to a further embodiment, the gas work $W_{KA}$ performed on the piston during an entire work cycle may be ascertained from the individual works $dW_K$ by summation, a high-pressure component and a low-pressure component (charge cycle work) resulting in accordance with the areas formed in the p-V diagram and the low-pressure component being taken into consideration in the summation by a negative sign.

Measuring range changes or sign changes may be processed according to a further embodiment in a simple way in that a new integrator run is started in each case and the corresponding proportional value of the integrator capacitance dp of the aborted integrator run is incorporated in the summation.

Furthermore, it can be advantageous to ascertain the top and bottom dead centers and/or other repeating points in time in the course of the work cycle and to incorporate them in the determination of the gas work $W_{KA}$.

If, according to a further embodiment, the low-pressure component (charge cycle work) for the particular operating point is taken from an ignition map upon the ascertainment of the gas work $W_{KA}$, no determination of individual works $dW_K$ is necessary during the exhaust and intake strokes, so that the control unit is further relieved in this time. Alternatively, it is possible that the low-pressure component (charge cycle work) is determined upon the ascertainment of the gas work $W_{KA}$ under the assumption that the cylinder pressure p corresponds to the intake manifold pressure during the intake stroke and corresponds to the ambient pressure during the exhaust stroke, so that no determination of individual works $dW_K$ has to be performed during the exhaust and intake strokes.

The control unit (ECU) according to various embodiments comprises an integrator and at least one calculation unit (CU) and executes steps of the type described above to ascertain the gas work $W_K$ performed by the cylinder pressure on the piston of a cylinder of an internal combustion engine.

A cyclic process known per se is first shown to explain the method in FIG. 1. For example, in four-stroke internal combustion engines, the combustion/cyclic process is divided into a high-pressure loop and a low-pressure loop. This is schematically illustrated by the p-V (pressure/volume) diagram of FIG. 1. The high-pressure loop is identified by AS and the low-pressure loop by LWS therein. The high-pressure loop AS is composed of a work curve K1 for the expansion or combustion phase of the cyclic process and a partial curve K2, which represents the compression phase of the cyclic process. The partial curve K3 of the low-pressure loop LWS (charge cycle work) represents the exhaust phase of the cyclic process. The partial curve K4 of the low-pressure loop LWS describes the behavior of the four-stroke internal combustion engine during its intake stroke. The high-pressure loop AS and the low-pressure loop LWS differ from one another essentially in the pressure level. While the low-pressure loop LWS is in a pressure range of approximately 1 bar, the high-pressure loop AS may go up to 3-digit numeric values for the cylinder pressure p in the extreme case. A measurement technology problem lies herein. Executed as analog sensors, pressure sensors deliver an electrical signal proportional to the physical variable, i.e., the cylinder pressure. This electrical signal is converted by electronics (in particular a measuring transducer) into a voltage signal and possibly amplified. The particular voltage signal output by the pressure sensor lies within a typical sensor output voltage range between 0 and 5 V, for example. This voltage signal is fed by the cylinder pressure sensor 3, compare FIG. 2, to the engine control unit and processed therein by an A/D converter (analog-digital converter) correctly for the processor. Typically, 8, 10, or 12 bit converters are used depending on the precision requirement. Higher-resolution converters are hardly used in automobile technology for reasons of EMC (electromagnetic compatibility). Because the particular pressure sensor is expediently designed for a maximum pressure range which may occur in the particular cylinder of the internal combustion engine, lower pressure values may only be reproduced coarsely, although a higher resolution may be provided by the sensor element of the pressure sensor. For example, with an A/D converter of 8 bit, which may thus represent 256 measuring points, and an output voltage range for the pressure sensor between 0 and 5 V, a resolution of 5 V/256=19 mV results. In contrast, the sensor element of the pressure sensor has a smallest physical resolution of approximately 1 mV, for example. This means that the output signals of the pressure sensor may first be detected and/or registered from 19 mV upon the A/D conversion because of the low number of measured points. In contrast, the measuring range from 0 to 18 mV of the pressure sensor lying below this—which theoretically corresponds to 19 measured values of the sensor element of the pressure sensor—remains unused in spite of higher resolution of the sensor element and may not be detected. In other words, an excessively low resolution for the output signal of the cylinder pressure sensor accompanies this. One possibility for remedying this is to divide the entire measuring range into multiple sections, as described in greater detail below.

Figure 2:
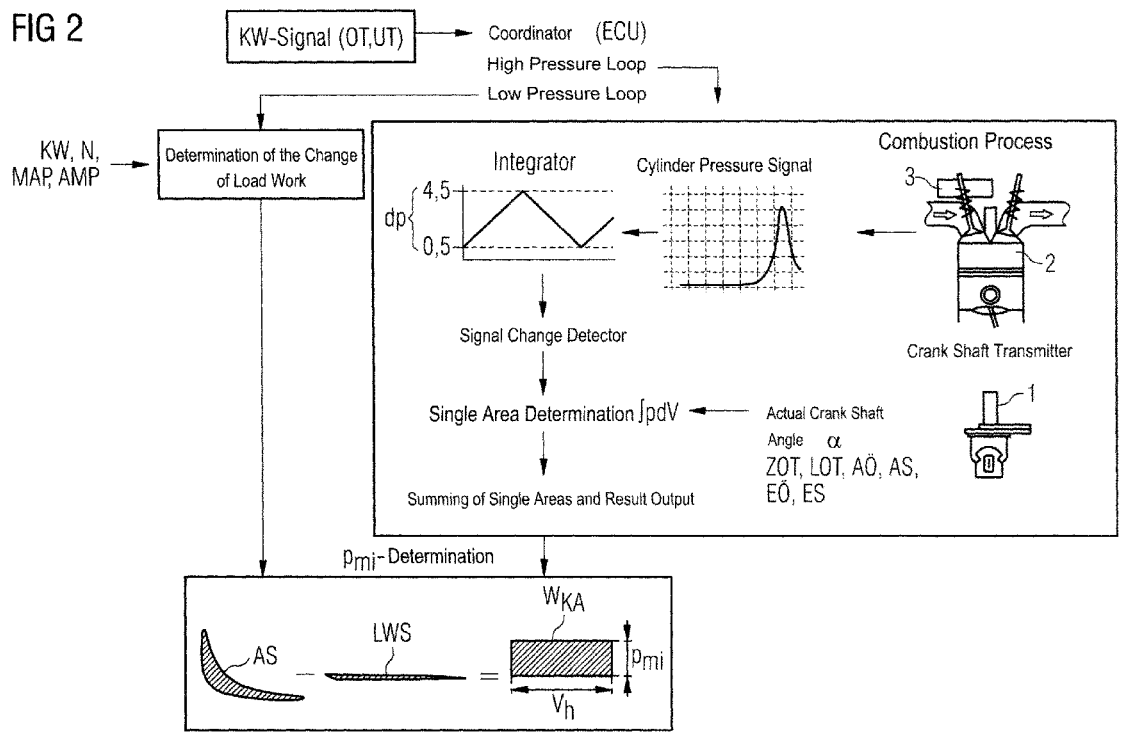
FIG. 2 shows a schematic illustration of an exemplary embodiment of the method for ascertaining the gas work and/or the internal mean pressure in a cylinder of an internal combustion engine.

Firstly, FIG. 2 shows, in its lower part, an illustration of the high-pressure component AS and the low-pressure component LWS, linked to FIG. 1, of the gas work $W_{KA}$ performed in the cyclic process and clarifies the determination of the internal mean pressure $p_{mi}$ from the area parts (an integral cylinder pressure p over $dV_\alpha$) over the stroke volume $V_h$. The two area parts, i.e., the high-pressure and low-pressure loops (charge cycle loop) LWS, are added, the latter with a negative sign, because work is performed on the gas during the charge cycle.

The block illustration according to FIG. 2 proceeds from a control unit, in particular an engine control unit ECU, to which the crankshaft angle signal of a crankshaft angle sensor 1 is applied. A cylinder pressure sensor 3 is situated in the combustion chamber of a cylinder 2 of the internal combustion engine, whose cylinder pressure signal is integrated by an integrator in a plurality of integrator runs of equal integrator capacitance. Specifically, the ascertainment of the gas work performed by the cylinder 2 according to various embodiments is performed in such a way that each time the integrator starts, in particular if a pressure range limit is exceeded or fallen below and a change to the adjoining measuring range occurs, the integrator value rises proportionally to the current cylinder pressure value. In the event of a high pressure and/or voltage signal, the integrator thus fills more rapidly than in the event of a low signal. In an advantageous embodiment, the integrator is implemented in such a way that it first ramps up in a first integrator run, compare FIG. 2, beginning from a lower threshold value. If an upper threshold value is reached, the curve reverses upon a new integrator run having inverted cylinder pressure signal, the integrator increasingly empties until the lower threshold value is reached again, and a new, rising integrator run begins. In contrast to an alternative implementation, in which the integrator is reset in each case after reaching an upper threshold value, so that overall a sawtooth curve of the integrator value occurs, this has the advantage that a continuous signal curve occurs and no chronological signal gaps occur due to the reset. The method thus gains precision. In the simplest case, the threshold values are fixed in such a way that the integrator value travels back and forth between the charge states (zero) and (full) of the integrator.

The sum of the integrator signal change (rising-falling-rising, etc.) determines how many individual areas are entered in the determination of the gas work $W_K$, i.e., in the area covered by the pressure over time. The integrator capacitance, i.e., the differential value dp, which is decisive for the frequency of the integrator signal change and/or integrator runs (in addition to the level of the cylinder pressure signal), is to be selected in such a way that a sufficient precision and/or resolution corresponding to the requirements is achieved. For example, a relatively large integrator capacitance dp may be used in (partial sections) of the high-pressure loop, while in (partial sections) of the low-pressure loop, which has a pressure curve having relatively small changes, a smaller integrator capacitance dp, i.e., a "finer measure" is advantageously to be used. To represent the desired area over the stroke volume $V_h$, the corresponding crankshaft angle is also recorded by the control unit upon each signal reversal. Because a fixed stroke volume value is assigned to each crankshaft angle, compare chapter 3.1, in particular equation (3.17), of the above-mentioned "Handbook of Internal Combustion Engines", more or fewer individual areas and/or individual works $dW_K$ occur during a work cycle of the internal combustion engine as a function of the integrator capacitance dp, which in sum result in the entire area $W_{KA}$ in the p-V diagram. If the total area $W_{KA}$ (high-pressure loop–low-pressure loop) is divided by the (known) stroke volume $V_h$ of the relevant cylinder 2, the desired mean pressure $p_{mi}$ is obtained, as indicated in the previously described, lower part of FIG. 2.

It is to be assumed that the integrator value is located between the lower and upper threshold values upon a measuring range change and/or upon the transition from the high-pressure to the low-pressure loop (and vice versa), upon which a sign change occurs. In these cases, the associated crankshaft angle is also stored and the corresponding proportional integrator capacitance dp is incorporated in the summation.

Furthermore, it can be advantageous in the course of the simplification and/or the precision increase of the method according to various embodiments to have additional information incorporated in the ascertainment of the gas work. Thus, one may assume, for example, that in contrast to the high-pressure loop AS, the low-pressure loop LWS remains stable at a fixed operating point from one cycle to the next. If one further assumes that the pressure conditions in the cylinder are constant in each case during the intake and exhaust strokes, the low-pressure loop may simply be calculated for each operating point and stored in an ignition map in the engine controller, for example. An experimental ascertainment of the low-pressure loop is also conceivable. Furthermore, an equalization of the cylinder pressure signal during the intake phase with an existing intake manifold pressure sensor is possible, because the cylinder internal pressure corresponds in a very good approximation to the intake manifold pressure when the intake valve is open. This favors the circumstance in particular that cylinder pressure sensors have to cover a wide measuring range (at most approximately 200 bar) and are thus imprecise at low pressures because of a lack of resolution. Furthermore, it is to be assumed that the cylinder pressure approximately corresponds to the ambient pressure during the exhaust stroke, i.e., when the exhaust valve is open. The signal of an existing ambient pressure sensor is used in this case. The contact to the outside world existing in this phase of the work cycle is thus exploited to decrease the computing work of the control unit, which does not have to execute a complex determination of individual works $dW_K$ in this time.

Furthermore, it is to be noted that the low-pressure loop LWS has a small area in comparison to the high-pressure loop AS, in particular at higher loads, and thus errors in the calculation of the low-pressure loop only have a small influence on the result.

The incorporation of significant corner points is also advantageous. These include the two top and bottom dead centers LOT, ZOT and the valve opening and closing times AÖ, AS, EÖ, ES, compare FIG. 2. Knowing the latter is important in particular for engines having camshaft phase adjustment, because upon changed valve control times, the location and/or beginning and end of the low-pressure and high-pressure loops shift.

The method according to various embodiments is also not susceptible to signal distubances, which occur in the form of high-frequency pressure oscillations. Because excess (positive) and missing (negative) area components balance the scale, the overall result is not corrupted in sum.

It is known per se that the pressure range to be detected by the cylinder pressure sensors is divided into two or more individual ranges for level limiting. The complete sensor travel (e.g., 0-5 V) is assigned to each individual range, e.g.:

| Pressure range: | sensor output: |
|---|---|
| 0-1 bar | 0-5 V |
| 1-5 bar | 0-5 V |
| 5-20 bar | 0-5 V |
| 20-100 bar | 0-5 V |
| 100-200 bar | 0-5 V |

The cylinder pressure sensor may change over independently between its various measuring ranges and communicate the particular activated measuring range to the engine controller using an extra control line. To save the latter, it is possible in connection with the method according to various embodiments for ascertaining the gas work performed by the cylinder that the operating point of the internal combustion engine is ascertained in the engine controller on the basis of at least one operating parameter for its combustion process, the expected chronological curve of the sensor raw signal of the measuring sensor is predicted from at least one ignition map information for the currently ascertained operating point, i.e., estimated, and it is ascertained by the engine controller on the basis of this predicted chronological sensor raw signal curve which measuring range section of the measuring sensor is currently activated.

What is claimed is:

1. A method for ascertaining the gas work $W_K$ performed by the cylinder pressure of a cylinder of an internal combustion engine on the piston of this cylinder, in which the cylinder pressure p is detected by a cylinder pressure sensor assigned to the cylinder, and the associated stroke volume $V_\alpha$ is derived from a crankshaft sensor assigned to a crankshaft, and in which the gas work $W_K$ is determined from the areas formed by the cylinder pressure curve over the stroke volume $V_\alpha$, the method comprising the steps of:
   starting a cylinder-pressure-proportional integrator, which integrates the signals of the cylinder pressure sensor in a number of integrator runs selected as a function of a settable integrator capacitance dp, the integrator capacitance dp being set by presetting a lower and upper threshold value for the integrator value,
   during at least one of the integrator runs, upon reaching one of the threshold values, starting a new integrator run, at the beginning and end of which the current crankshaft angle $\alpha$ is detected,
   for each integrator run, determining the associated individual work $dW_K$ on the basis of the product of the integrator capacitance and the particular covered stroke volume $dV_\alpha$, and
   determining the gas work $W_K$ resulting from the cylinder pressure curve by summation of the individual works $dW_K$ determined for each of integrator runs.

2. The method according to claim 1, wherein the integrator runs for ascertaining the gas work occur over at least one predefinable partial range of the work cycle.

3. The method according to claim 1, wherein the integrator capacitance dp is set differently in at least two predefinable partial sections of a work cycle with the aid of the threshold values.

4. The method according to claim 1, wherein the integrator is reset to the lower threshold value for a new integrator run upon reaching the upper threshold value.

5. The method according to claim 1, wherein the integrator is impinged with an inverted signal of the cylinder pressure sensor for a new integrator run upon reaching the upper threshold value until the lower threshold value is reached, so that the integrator value runs back and forth between the two threshold values during the integrator runs.

6. The method according to claim 1, wherein the range of the cylinder pressure to be detected by the cylinder pressure sensor is divided into at least two individual ranges and a complete sensor travel is assigned to each individual range, the integrator being started in each case upon reaching a measuring range limit.

7. The method according to claim 1, wherein the gas work $W_{KA}$ performed on the piston during a work cycle is ascertained from the individual works $dW_K$ by summation, a high-pressure component AS and a low-pressure component LWS (charge cycle work) resulting in accordance with the areas formed in the p-V diagram and the low-pressure component LWS being taken into consideration in the summation by a negative sign.

8. The method according to claim 6, wherein a new integrator run is started upon a measuring range change or a sign change and the corresponding proportional value of the integrator capacitance dp of the aborted integrator run is incorporated in the summation.

9. The method according to claim 7, wherein the top and bottom dead centers or other moments in time repeating in the course of the work cycle are ascertained and incorporated in the determination of the gas work $W_{KA}$.

10. The method according to claim 7, wherein the top and bottom dead centers and other moments in time repeating in the course of the work cycle are ascertained and incorporated in the determination of the gas work $W_{KA}$.

11. The method according to one of claims 7 through 9, characterized in that, upon the ascertainment of the gas work $W_{KA}$, the low-pressure component (charge cycle work) LWS for the particular operating point is taken from an ignition map, so that no determination of individual works $dW_K$ occurs during the exhaust and intake strokes.

12. The method according to claim 7, wherein, upon the ascertainment of the gas work $W_{KA}$, the low-pressure component (charge cycle work) LWS is determined under the assumption that the cylinder pressure p corresponds to the intake manifold pressure during the intake stroke and to the ambient pressure during the exhaust stroke, so that no determination of individual works $dW_K$ occurs during the exhaust and intake strokes.

13. The method according to claim 7, wherein the ascertainment of the gas work $W_{KA}$ performed over the entire work cycle is used to determine the internal mean pressure $p_{mi}$ of the cylinder.

14. The method according to claim 13, wherein at least one of the power and the torque of the internal combustion engine are determined with the aid of the internal mean pressure of the cylinder.

15. The method according to claim 1, wherein selecting the number of integrator runs as a function of a settable integrator capacitance dp comprises selecting the frequency of integrator runs as a function of a settable integrator capacitance dp.

16. A control unit having an integrator and at least one calculation unit for ascertaining the gas work $W_K$ performed by the cylinder pressure on the piston of a cylinder of an internal combustion engine, wherein the integrator and at least one calculation unit are operable:
   to start a cylinder-pressure-proportional integrator, which integrates the signals of a cylinder pressure sensor in a number of integrator runs selected as a function of a settable integrator capacitance dp, the integrator capacitance dp being set by presetting a lower and upper threshold value for an integrator value,
   during at least one of the integrator runs, upon reaching one of the threshold values, to start a new integrator run, at the beginning and end of which the current crankshaft angle $\alpha$ is detected, and
   for each integrator run, to determine the associated individual work $dW_K$ on the basis of the product of the integrator capacitance and the particular covered stroke volume $dV_\alpha$, and
   to determine the gas work $W_K$ resulting from the cylinder pressure curve by summation of the individual works $dW_K$ determined for each of integrator runs.

17. The control unit according to claim 16, wherein the integrator runs for ascertaining the gas work occur over at least one predefinable partial range of the work cycle.

18. The control unit according to claim 16, wherein the integrator capacitance dp is set differently in at least two predefinable partial sections of a work cycle with the aid of the threshold values.

19. The control unit according to claim 16, wherein the integrator is reset to the lower threshold value for anew integrator run upon reaching the upper threshold value.

20. The control unit according to claim 16, wherein the integrator is impinged with an inverted signal of the cylinder pressure sensor for a new integrator run upon reaching the upper threshold value until the lower threshold value is reached, so that the integrator value runs back and forth between the two threshold values during the integrator runs.

21. The control unit according to claim 16, wherein the range of the cylinder pressure to be detected by the cylinder pressure sensor is divided into at least two individual ranges and a complete sensor travel is assigned to each individual range, the integrator being started in each case upon reaching a measuring range limit.

22. The control unit according to claim 16, wherein selecting the number of integrator runs as a function of a settable integrator capacitance dp comprises selecting the frequency of integrator runs as a function of a settable integrator capacitance dp.

\* \* \* \* \*